(12) United States Patent
Yi et al.

(10) Patent No.: US 11,071,124 B2
(45) Date of Patent: Jul. 20, 2021

(54) METHOD FOR CONNECTING TO A BASE STATION WITH FLEXIBLE BANDWIDTH

(71) Applicant: LG Electronics Inc., Seoul (KR)

(72) Inventors: Yunjung Yi, Seoul (KR); Kijun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 81 days.

(21) Appl. No.: 16/064,660

(22) PCT Filed: Apr. 20, 2017

(86) PCT No.: PCT/KR2017/004245
§ 371 (c)(1),
(2) Date: Jun. 21, 2018

(87) PCT Pub. No.: WO2017/183926
PCT Pub. Date: Oct. 26, 2017

(65) Prior Publication Data
US 2019/0037579 A1    Jan. 31, 2019

Related U.S. Application Data

(60) Provisional application No. 62/325,427, filed on Apr. 20, 2016.

(51) Int. Cl.
| H04W 72/12 | (2009.01) |
| H04L 5/00 | (2006.01) |
| H04L 1/00 | (2006.01) |
| H04W 16/14 | (2009.01) |
| H04L 27/26 | (2006.01) |

(52) U.S. Cl.
CPC ............. *H04W 72/12* (2013.01); *H04L 1/00* (2013.01); *H04L 5/001* (2013.01); *H04L 5/0048* (2013.01); *H04L 5/0092* (2013.01); *H04L 5/0098* (2013.01); *H04L 27/2613* (2013.01); *H04W 16/14* (2013.01); *H04L 5/0091* (2013.01); *H04L 27/2602* (2013.01); *H04L 27/2692* (2013.01)

(58) Field of Classification Search
CPC ......... H04L 5/0048–0057; H04W 72/04–0493
See application file for complete search history.

(56) References Cited

U.S. PATENT DOCUMENTS 8,891,467 B2    11/2014 Awoniyi
9,577,800 B2    2/2017 Seo et al.
(Continued)

OTHER PUBLICATIONS

InterDigital Communications, "Reference signal principles for NR", R1-162578, 3GPP TSG-RAN WG1 #84bis, Busan, Korea, dated Apr. 11-15, 2016, 3 pages.
ZTE, "Consideration on forward compatibility for new radio interface", R1-163392, 3GPP TSG RAN WG1 Meeting #84bis, Busan, Korea, dated Apr. 11-15, 2016, 5 pages.
(Continued)

*Primary Examiner* — Marcus Smith
(74) *Attorney, Agent, or Firm* — Fish & Richardson P.C.

(57) ABSTRACT

The disclosure of the present invention proposes a method for connecting to a base station. The method may be performed by a user equipment (UE) and comprise: receiving information on a UE-specific bandwidth of a first cell. Here, the UE-specific bandwidth of the first cell is variable based on a bandwidth of a second cell using long term evaluation (LTE) radio access technology (RAT). The information on the UE-specific bandwidth may indicate a bandwidth between a bandwidth between a minimum bandwidth and a maximum bandwidth.

10 Claims, 9 Drawing Sheets

(56) References Cited

U.S. PATENT DOCUMENTS

| | | |
|---|---|---|
| 2010/0091793 A1 | 4/2010 | Kenney |
| 2012/0236740 A1 | 9/2012 | Dhanapal |
| 2013/0115994 A1 | 5/2013 | Awoniyi |
| 2016/0100395 A1* | 4/2016 | Xu .................... H04W 72/1231 370/336 |
| 2016/0127097 A1* | 5/2016 | Chen ..................... H04L 5/0051 370/330 |
| 2016/0316374 A1* | 10/2016 | Xu ......................... H04W 16/14 |
| 2017/0180095 A1* | 6/2017 | Xue ....................... H04L 5/0048 |
| 2017/0265156 A1* | 9/2017 | Xue ....................... H04L 5/0092 |
| 2018/0103459 A1* | 4/2018 | Liu ........................ H04L 1/0038 |
| 2018/0152923 A1* | 5/2018 | Xiong ................... H04L 5/0053 |
| 2018/0206271 A1* | 7/2018 | Chatterjee ............. H04L 5/0053 |
| 2018/0287846 A1* | 10/2018 | Kim ..................... H04L 27/2662 |
| 2019/0029005 A1* | 1/2019 | Bendlin .............. H04W 72/042 |
| 2019/0124699 A1* | 4/2019 | Yamada ............ H04W 74/0866 |

OTHER PUBLICATIONS

Samsung, "Discussion on forward compatibility for 5G new radio interface", R1-162173, 3GPP TSG RAN WG1 #84bis, Busan, Korea, dated Apr. 11-15, 2016, 3 pages.
Korean Notice of Allowance in Korean Application No. 1020187019157, dated Jan. 21, 2019, 7 pages (with English translation).
Korean Office Action in Korean Application No. 1020187019157, dated Dec. 30, 2018, 7 pages (with English translation).
Ericsson, "Flexible Bandwidth in NR," 3GPP TSG-RAN WG1 #84bis, R1-163228, Apr. 11-15, 2016, 4 pages.

* cited by examiner

METHOD FOR CONNECTING TO A BASE STATION WITH FLEXIBLE BANDWIDTH

CROSS-REFERENCE TO RELATED APPLICATIONS

This application is a National Stage application under 35 U.S.C. § 371 of International Application No. PCT/KR2017/004245, filed on Apr. 20, 2017, which claims the benefit of U.S. Provisional Application No. 62/325,427, filed on Apr. 20, 2016. The disclosures of the prior applications are incorporated by reference in their entirety.

BACKGROUND OF THE INVENTION

Field of the Invention

The present invention relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience.

In the new RAT, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating new RAT efficiently, various schemes have to be adopted. However, until now, efficient scheme has not been introduced.

SUMMARY OF THE INVENTION

Accordingly, the disclosure of the specification has been made in an effort to solve the problem.

To achieve the foregoing purposes, the disclosure of the present invention proposes a method for connecting to a base station. The method may be performed by a user equipment (UE) and comprise: receiving information on a UE-specific bandwidth of a first cell. Here, the UE-specific bandwidth of the first cell is variable based on a bandwidth of a second cell using long term evaluation (LTE) radio access technology (RAT). The information on the UE-specific bandwidth may indicate a bandwidth between a minimum bandwidth and a maximum bandwidth.

The information on the UE-specific bandwidth may be received via physical broadcast channel (PBCH) or system information or higher layer signaling.

The first cell may use a remaining bandwidth except for the bandwidth of the second cell among an entire bandwidth.

The method may further comprise: receiving cell common information in a center frequency region of the minimum bandwidth.

The cell common information may include at least one of: a synchronization signal, a master information block (MIB) on a physical broadcast channel (PBCH), and a system information block (SIB).

The method may further comprise: receiving information for configuring, as a blank resource, the bandwidth of the second cell using the LTE RAT or resources used for control, reference signal (RS), and a physical random access channel (PRACH) transmission of LTE RAT.

The method may further comprise: considering, as a blank resource, a slot or a subframe or a set of OFDM symbols used by the LTE RAT of the second cell.

The method may further comprise: considering, as a blank resource, a RS pattern used by the LTE RAT of the second cell.

The method may further comprise: performing a time synchronization with the first cell based on the second cell using the LTE RAT. The second cell using the LTE RAT may be configured as a time reference cell.

To achieve the foregoing purposes, the disclosure of the present invention proposes a user equipment (IE) for connecting to a base station. The UE may comprise: a transceiver; and a processor configured to control the transceiver to receive information on a UE-specific bandwidth of a first cell. Here, the UE-specific bandwidth of the first cell is variable based on a bandwidth of a second cell using long term evaluation (LTE) radio access technology (RAT). The information on the UE-specific bandwidth indicates a bandwidth between a minimum bandwidth and a maximum bandwidth.

According to the disclosure of the present specification, the problems of the above-described prior art are solved.

DESCRIPTION OF EXEMPLARY EMBODIMENTS

Figure 1:
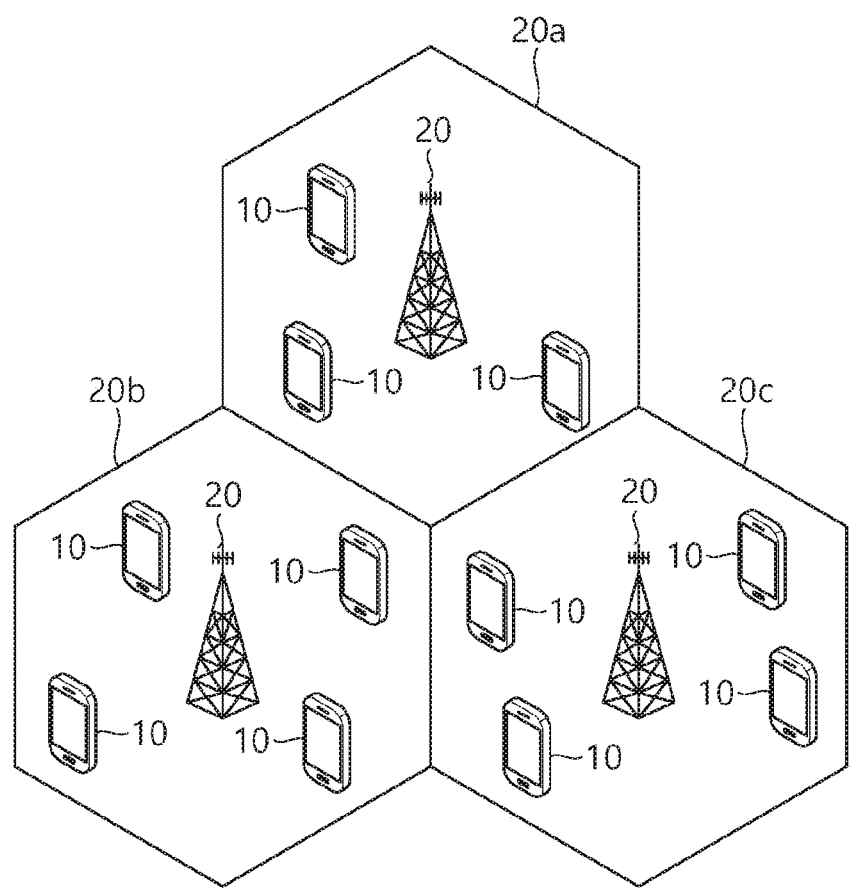
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20$a$, 20$b$, and 20$c$. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Figure 2:
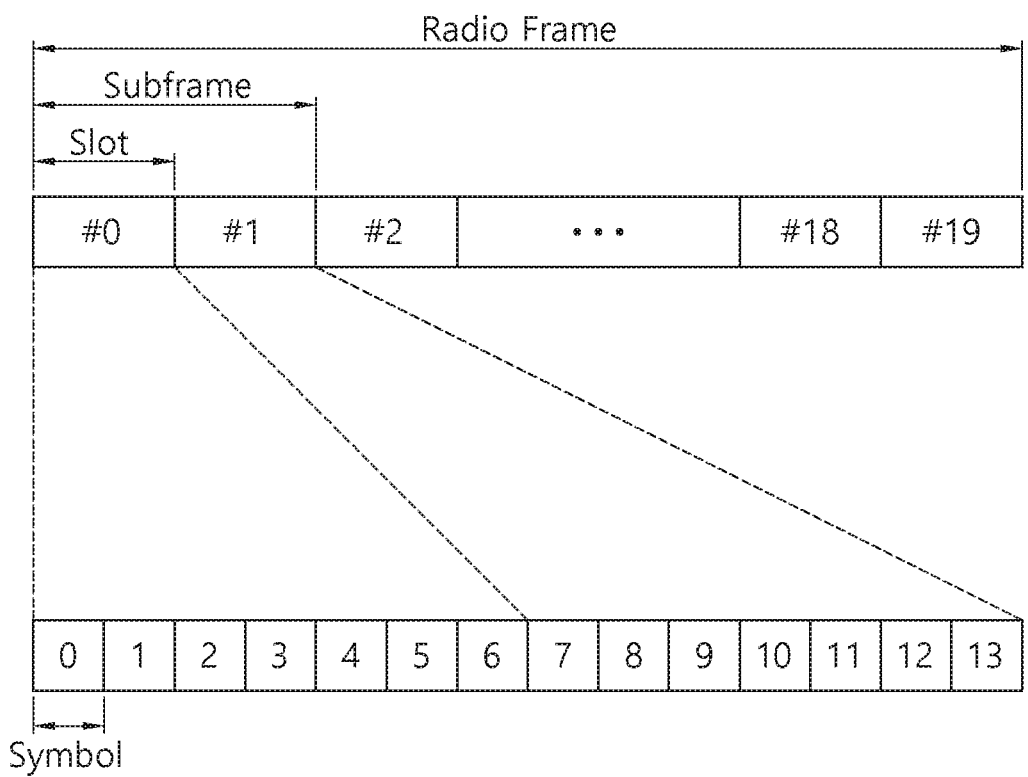
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame includes 10 subframes indexed 0 to 9. One subframe includes two consecutive slots. Accordingly, the radio frame includes 20 slots. The time taken for one subframe to be transmitted is called a transmission time interval (TTI). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP.

Herein, since the 3GPP LTE uses orthogonal frequency division multiple access (OFDMA) in downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

As such, one subframe is called as a transmission-time-interval (TTI). TTI refers to the duration of a transmission. So, the base station schedule the radio resource in unit of the TTI, e.g., subframe.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a physical uplink shared channel (PUSCH) transmitted through other component carriers than the component carrier basically linked to a specific component carrier and/or resource allocation of a physical downlink shared channel (PDSCH) transmitted through other component carriers through a physical downlink control channel (PDCCH) transmitted through the specific component carrier.

<Next Generation Mobile Network>

5th generation mobile networks or 5th generation wireless systems, abbreviated 5G, are the proposed next telecommunications standards beyond the current 4G LTE/international mobile telecommunications (IMT)-advanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (NR).

In NR, utilizing a subframe in which downlink and uplink are contained may be considered. This scheme may be applied for paired spectrum and unpaired spectrum. The paired spectrum means that one carrier consists of two parts of spectrum for downlink and uplink operation. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further in new RAT, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 3:
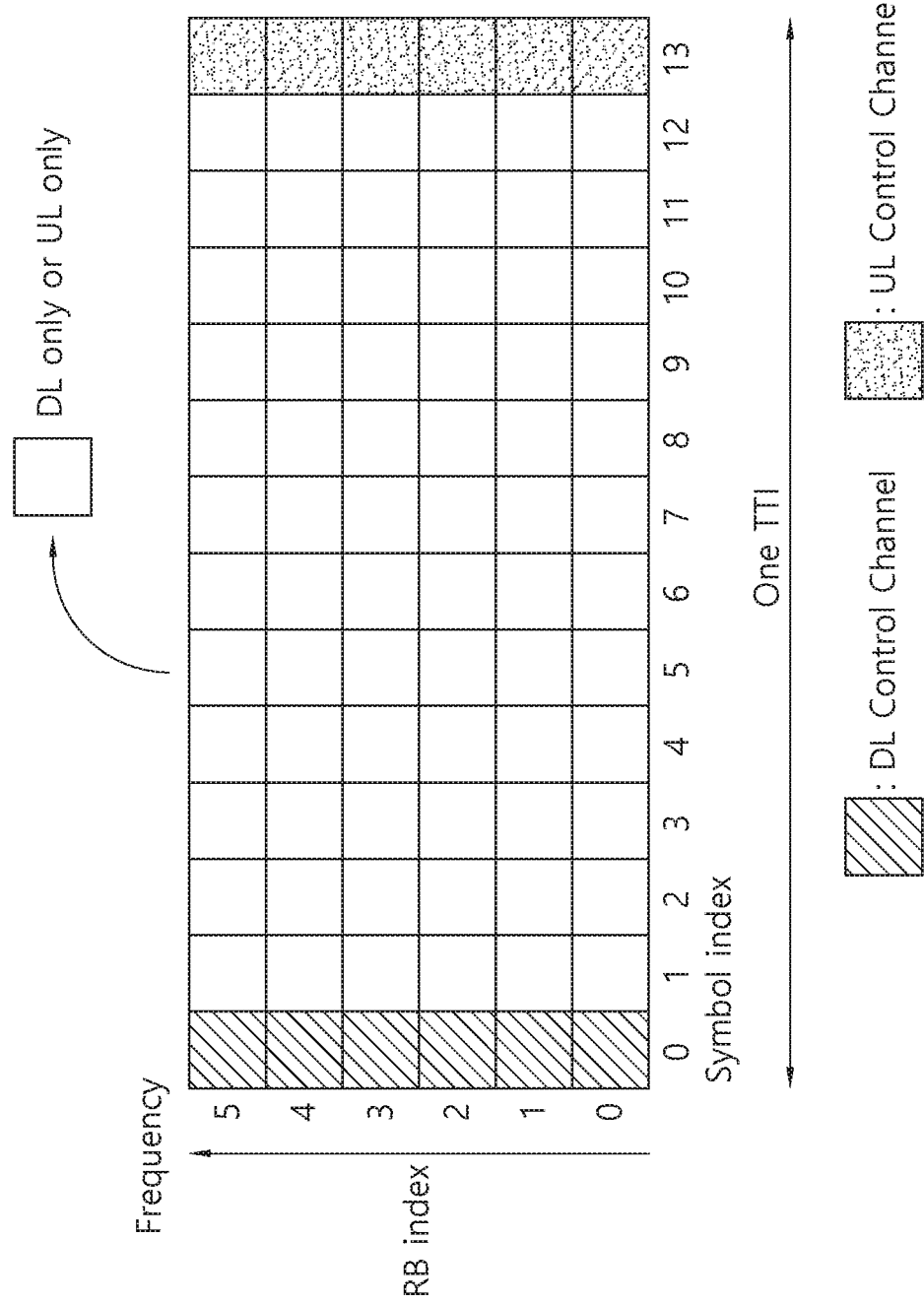
FIG. 3 shows an example of subframe type for new RAT.

FIG. 3 shows an example of subframe type for new RAT.

The subframe shown in FIG. 3 may be used in TDD system of new RAT, in order to minimize latency of data transmission. Referring to FIG. 3, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

DISCLOSURE OF THE INVENTION

Due to an introduction of the new RAT, it is likely that UEs supporting only LTE and supporting both may coexist. In such a case, depending on advanced UE percentage, it would be beneficial to dynamically change the portion of 5G frequency usage or LTE frequency usage in the same frequency band.

I. Flexible Bandwidth Between LTE RAT and the New RAT.

Figure 4:
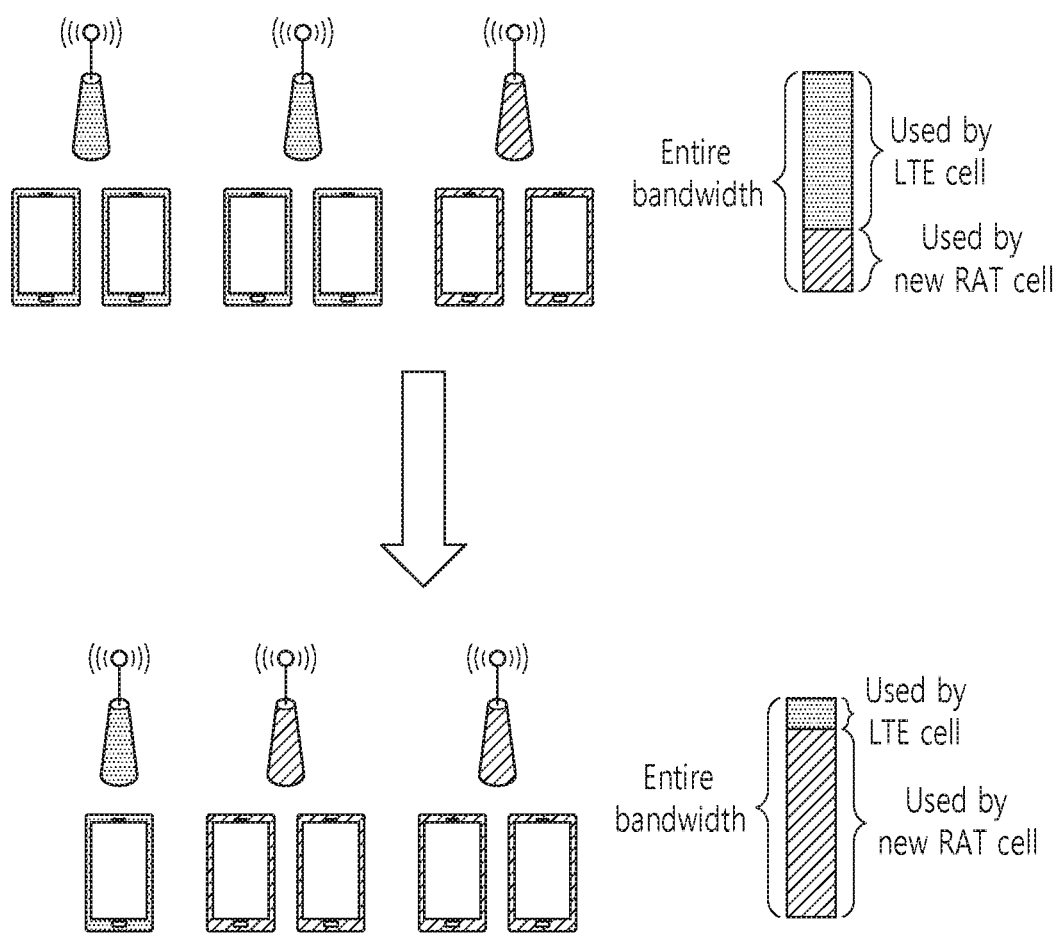
FIG. 4 illustrates an example of a concept of flexible bandwidth

FIG. 4 illustrates an example of a concept of flexible bandwidth

As shown in FIG. 4, a bandwidth used by LTE cell is greater than a bandwidth used by new RAT cell. If a network operator wants to reduce bandwidth used by LTE cell, the network may perform "SCell off" operation.

To support this operation, the following approaches can be considered from LTE perspective.

if a LTE-UE may not support "flexible bandwidth", it is necessary to de-attach all UEs from LTE carrier and change the system bandwidth by updating MIB/SIBs to change the system bandwidth. This however would lead some latency to reconfigure MIB/SIB information, and thus may not provide dynamic reconfiguration or flexible spectrum sharing between two technologies.

Another approach, instead of relying on system information update on system bandwidth, is to use "intra-frequency" CA mechanism in LTE RAT. For example, if an entire bandwidth is M Mhz, it can be divided to K*M/K MHz chunks. Here, UEs can support M Mhz via intra-CA capability. In this case, to disable one or a few frequency chunks, the network can simply deactivate "SCell" and perform "off". To transmit discovery signals, regularly, 5G network may not use some resources used by discovery signals to minimize the interference. In terms of reserving some resources for discovery signal transmission, discovery signals may puncture transmitted 5G/NR signals. For example, signals based on 15 kHz subcarrier spacing is used in new RAT (abbreviated as NR), the resources used for discovery signals can puncture NR signals transmitted. Due to discovery signal, the performance of NR signals can be degraded, for example, control signals and data signals are rather deteriorated. The handling of this is done by proper code rate adaption and resource allocation by scheduling.

A LTE-UE may support "flexible bandwidth". In this case, LTE-cell may configure a minimum bandwidth as small and allow flexible bandwidth operation to LTE-UEs where it can adapt the size of bandwidth dynamically. 5G cell could also adapt the bandwidth dynamically depending on LTE/5G UE populations.

A LTE UE may also support new RAT technology. Here, LTE and NR can be flexibly interchanged from LTE-UE perspective. Assuming NR efficiency is generally better than LTE, if UEs support both LTE and 5G it is better to operate with 5G unless there is coverage difference. In this sense, if all UEs are also supporting NR, the problem of sharing may not be significant where LTE RAT based SCell can be deactivated, and NR can adapt its system bandwidth flexibly to cover the entire system bandwidth.

From NR supporting UE perspective, two possibilities are considered.

NR UEs can also support LTE

NR UEs may not support LTE: This implies that NR UEs may also support LTE in different frequency band, but they do not support LTE in the same spectrum where 5G can be operated.

(1) New RAT UE System Bandwidth Signalling

The system bandwidth of new RAT may be dynamically changed depending on the usage of LTE spectrum or other usage (for example, by utilizing additional spectrum in licensed shared access or by utilizing unlicensed spectrum—dynamic allocation of unlicensed spectrum).

Accordingly, it is necessary to signal "minimum" and "maximum" system bandwidth that the cell intends to support for the UEs.

Figure 5:
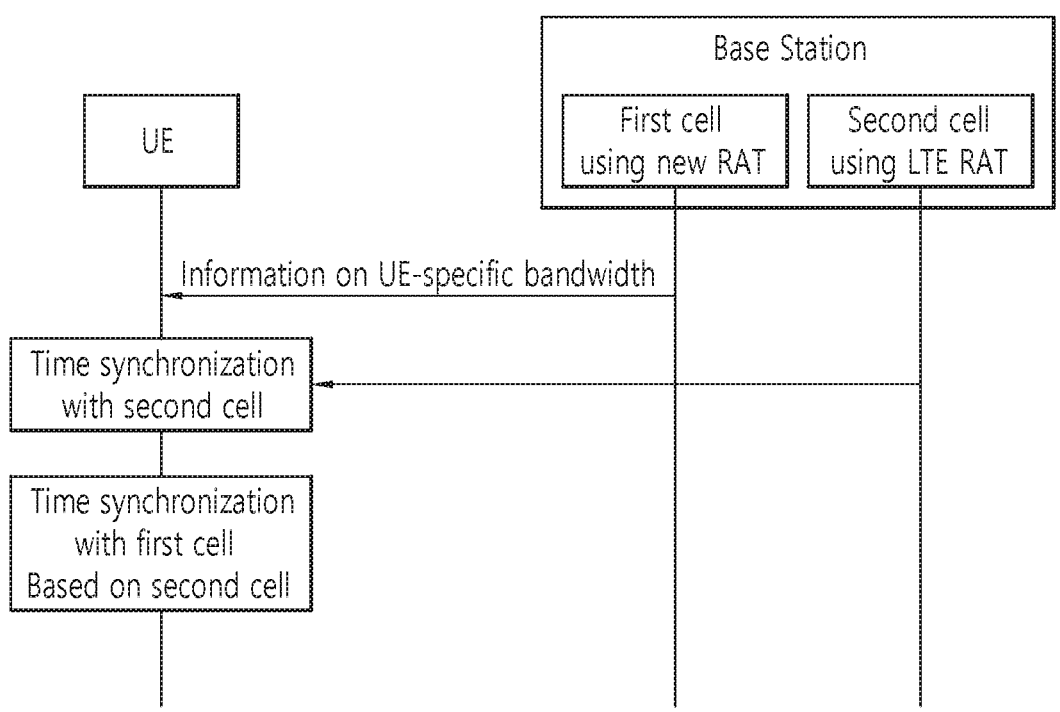
FIG. 5 illustrates an example that UE is informed of information on a bandwidth.

FIG. 5 illustrates an example that UE is informed of information on a bandwidth.

As shown in FIG. 5, the base station may operate a first cell and the second cell. Here, the first cell may use the new RAT and the second cell may use the LTE RAT. The base station may transmit information on UE-specific bandwidth of the first cell using the new RAT.

Also, it is possible that the center frequency of synchronization signal or predetermined signal which is generally used for a center frequency may not be in the center of maximum system bandwidth. In that sense, it is also desirable to indicate "center frequency" (or offset between a center frequency of minimum system bandwidth and a center frequency of the reference signal such as primary synchronization signal (PSS)) of minimum system bandwidth and maximum frequency (or the offset between reference signal and center of maximum SBW). These information can be forwarded through synchronization signals and/or MIB and/or SIB. By knowing the range, UE may be able to adjust its receiving bandwidth (both RF and baseband) potentially to reduce power consumption or for other purposes. It is however desirable that the maximum system bandwidth cannot exceed a RF bandwidth of a UE assuming a center frequency of the reference signal or assuming UE may retune the RF to a center frequency of a maximum system bandwidth. Meanwhile, in view of a direct current (DC) handling, it is desirable that DC would not be changed, thus DC may be placed in the center of reference signals or minimum system bandwidth.

Between a minimum system bandwidth (min_SBW) and a maximum system bandwidth (max_SBW), it is assumed that any cell-common signals such as synchronization signals, a physical broadcast channel (PBCH), and potentially system information block (SIB) may be transmitted within min_SBW. For multi-cell operation, a coordinated multi point (CoMP) transmission, a multimedia broadcast and multicast service (MBMS), and etc would be performed on min_SBW. Or system bandwidth applied for each operation may be separately configured depending on the deployment scenarios of neighbour cells. If it is supported beyond min_SBW, dynamic signalling may be necessary to change the bandwidth. If semi-statically min_SBW is changed, it is also possible that min_SBW is equal to max_SBW. It is noted that min_SBW, max_SBW, and/or operating system bandwidth can be indicated by PBCH or system information as well.

Regardless of multiple connections, synchronization may be performed once. If additional synchronization is necessary for different connection, it is required to perform again.

Different RRC parameters/U-Plane bearer and etc can be configured per each connection Each connection may have different blank resources and/or different system bandwidth and/or different numerology and/or different TTI length. This would be also applied to other cases.

(2) LTE Signal Protection

If NR UEs can support "rate matching" around cell-specific signals of LTE, spectrum allocated to LTE can be dynamically used for NR UEs if numerologies are compatible. For example, NR UEs can be signalled with frequency range where LTE cell may transmit a legacy LTE physical downlink control channel (PDCCH)" and/or cell-specific reference signal (CRS), then NR UEs can perform rate matching if data and/or control is scheduled on the overlapped portion with LTE carrier. Necessary information such as the length of PDCCH, CRS antenna port #, cell ID or vshift value would be also signalled. In case, the same RE location between NR reference signal (RS) and LTE RS collide, a UE may assume that LTE RS may not be transmitted in the resources signalled for NR. Even though a UE supports both RATs, the approaches mentioned in (1) can be still applied. Major difference between (1) and (2) is to utilize the known information of legacy signals for rate matching or data reception.

II. Initial Cell Search

In the frequency spectrum where NR and LTE can coexist, a UE may perform both LTE and NR cell search algorithms. As there could be LTE and NR synchronization signals in the same frequency, the UE may attempt to start initial access either LTE or NR. When a UE is associated with either LTE or NR, after capability signalled, the UE can be reconfigured or hand-overed to the NR or LTE (i.e., different RAT). For this, in the PRACH configuration resource in LTE, the base station may also signal the PRACH resources which can be also used for NR UEs. In other words, one or more PRACH resources can be signalled. The one or more PRACH can be used for UEs supporting both NR and LTE. When those resources are used, the network may perform NR operation on such UEs. When the network which supports both NR/LTE may perform one of the followings.

(1) When the base station transmits RAR, the base station can signal the frequency of NR to hand-over the UE to new RAT. The base station can also signal the frequency of the LTE. Or, the frequencies can be configured by RRC signals in MSG 4 instead. The information would include "frequency", "bandwidth", and/or the RAT type.

(2) From the transmission of RAR, the base station may signal or send all RS/data based on NR format. From a UE perspective, all the LTE cell-common (or backward compatible) signals can be rate matched or punctured. In terms of cell-common signals, it can be informed via UE-specific signals or cell-specific signals or group-specific signals. In this sense, the network may form LTE and NR in the same spectrum where LTE UE and NR UE can be multiplexed in different manners such as FDM/TDM/CDM/spatial multiplexing, etc.

Figure 6:
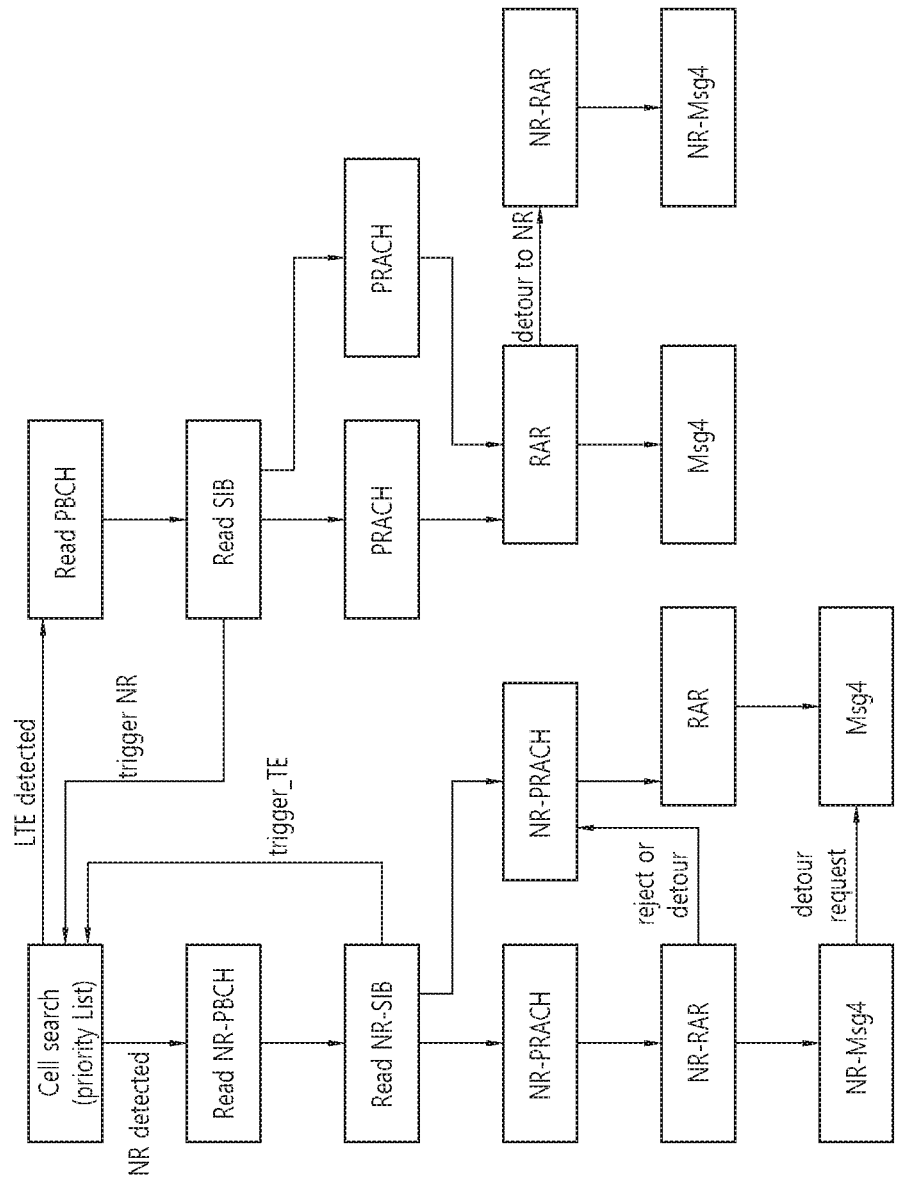
FIG. 6 exemplarily illustrates a procedure of cell association.

FIG. 6 exemplarily illustrates a procedure of cell association.

Overall, the procedure of cell association can be as follows.

(1) Cell search: two cases are considered.

A. Cell search signals such as a primary synchronization signal (PSS) and a secondary synchronization signal (SSS) are common in LTE and NR—when a cell supports both RATs, a common cell search signals are transmitted. In this case, it is assumed that the cell would also transmit legacy PBCH and/or legacy SIB so that legacy LTE UEs can access the LTE cells. The legacy PBCH and/or legacy SIBs can be optionally not transmitted by the network if there are no expected legacy UEs in the network. Furthermore, if LTE cell is used only for SCell from LTE legacy UEs perspective, legacy PBCH and/or legacy SIBs may or may not be present.

B. Cell search signals are independent and may be different in LTE and NR—a UE may have different receiver algorithms to detect each RAT's synchronization signals In case B is assumed, a UE may be configured with a priority list where in each frequency either LTE or NR is first searched. The priority RAT can be configured per frequency or band or per frequency region.

(2) PBCH reading: when the same signals are used, it is also assumed that the same PBCH transmission is also used. In this case, legacy PBCH may include RAT type utilizing reserved bits or reshuffle the PBCH entries. Alternatively, even with the same synchronization signals, different PBCH may be transmitted which utilizes different resources. One additional synchronization signal may be present for new RAT and a UE may attempt to read NR related PBCH and the associated SI transmissions. The example of additional signal can be beam indicator or extended synchronization signals which can be used for location of synchronization signals and/or beam direction. In case, different synchronization signals are used, different PBCH may be assumed, and following synchronization signals, the UE reads the corresponding PBCH (NR-PBCH and PBCH respectively for NR and LTE).

(3) SIB reading: based on PBCH, either NR-SIB or SIB can be read. In NR-SIB, if the network wants to detour UEs to LTE carrier, it can signal "LTE center frequency". The UE may switch to the LTE center frequency and starts LTE cell association. If the UE does not support LTE, it may ignore the field and proceed with NR cell association.

A. In SIB, different PRACH configurations can be given. In NR, PRACH resources for LTE can be configured. If the UE selects LTE PRACH resources, the corresponding cell association would be done based on LTE procedure. In this case, PBCH/SIB for LTE can be UE-specifically signalled rather than a UE needs to read broadcasted PBCH/SIB transmissions. In other words, though the cell supports both RATs, it may broadcast either LTE or NR related common signals for PBCH/SIB. In terms of switching UEs from different RATs, those information can be given via UE-specific signalling instead.

B. In terms of RACH procedure, offloading via RACH procedure can be considered. When the network receives NR-PRACH where there are many UEs with NR, it may send "reject" signals such that LTE-supporting UEs can be detour to the LTE. In terms of "reject", it can send "overloading" indicator in each PRACH resource such that UEs supporting both RATs can select one PRACH resource based on also the loading conditions of each RAT type. In other words, each PRACH resource can include optional field of "RAT indication" and "overloading" indication such that UEs supporting both may utilize those information for better selection of RAT and PRACH resource. Though the network may be able to dynamically change the frequency portion of each RAT, dynamic loading can be used also to balance between different RATs. This information can be also indicated in PDCCH order or PRACH trigger which can be used for hand-over operation or change the RAT behaviour of a UE. Once a UE is configured with PRACH trigger with different RAT type from the operating RAT type, it may perform necessary handover procedure. Furthermore, if a UE is configured with multiple connections, PRACH trigger can be applied to all connections or partially to subset of connections. This implies that all or partial subset of connections can be switched to different RAT type or cell. Furthermore, a UE may select different RAT based on its application characteristics or requirements.

(4) RACH Procedure

Based on PRACH resource selection, different RAR and RACH procedure may be expected. In NR, additional PRACH resource for LTE can be configured which are then responded with either NR-Msg3 or legacy Msg3. When the UE starts from legacy signals, it may initiate with legacy RACH procedure, which can be detoured when Msg 4 is received or via RAR.

(5) RRC Configuration:

Based on each RAT type, appropriate resource configuration is given.

Another approach is that a UE can be associated with the cell using either via NR or LTE depending on the searched synchronization signals and/or PBCH signals. Once the UE is connected with any RAT type, the cell may indicate "additional" resources of different RAT. From a UE perspective, it is single carrier where different RAT type coexists in the same carrier.

Figure 7:
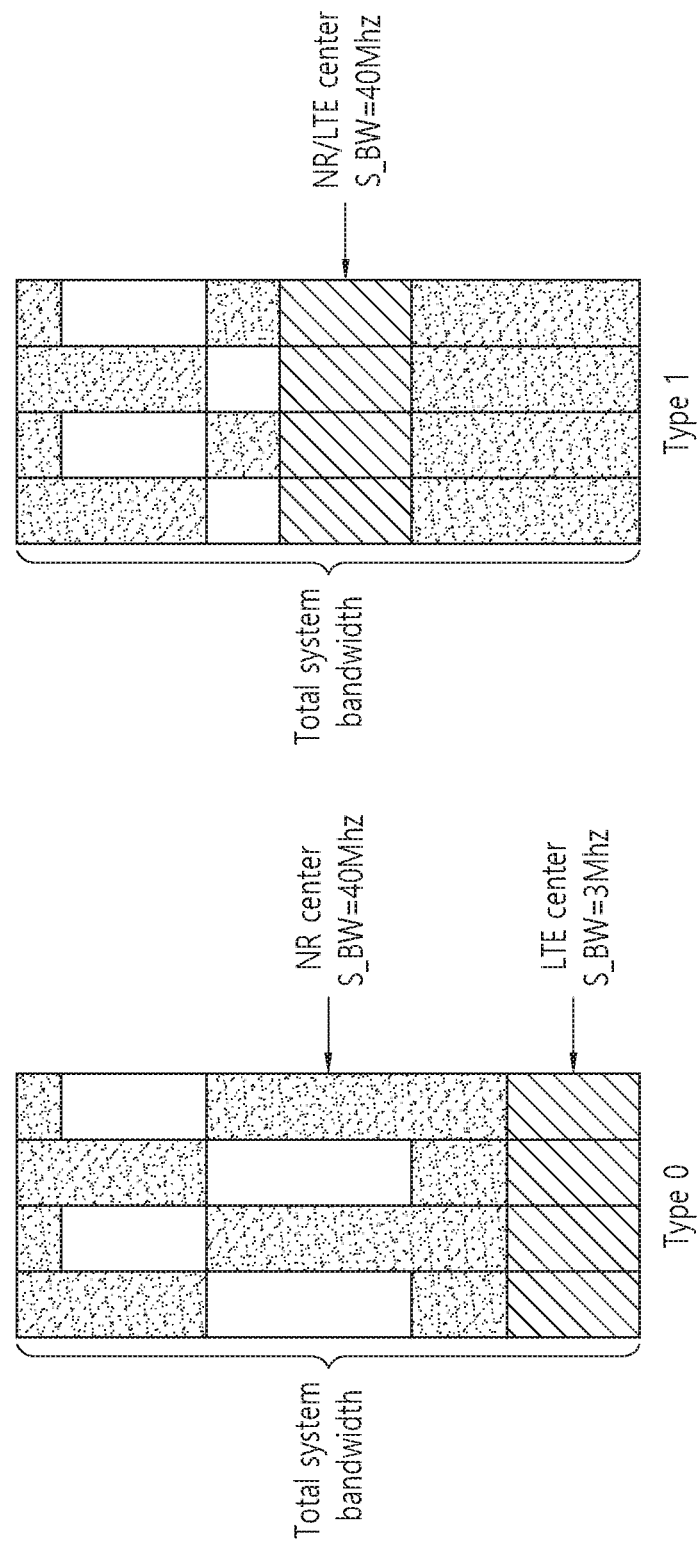
FIG. 7 exemplarily shows examples of different cases.

FIG. 7 exemplarily shows examples of different cases.

Type 0: when LTE center frequency is not aligned with NR center frequency. If NR uses "center frequency DC", it may be able to use it also for LTE. It is however expected that NR may not reserve DC tone (as similar to LTE synchronization signals) to avoid alignment between center and synchronization signals. In this case, as LTE needs to use center frequency DC, the DC should be accounted in resource block formation properly. One approach is to absorb the DC in the adjacent PRB of NR where the adjacent PRB consist of N−1 subcarriers instead of N carriers. Alternatively, no additional handling on DC is assumed, or DC is shared between LTE and NR carrier where RB grid can be different between LTE and NR. Once a UE is associated with LTE carrier, additional NR PRBs are configured with center frequency, system bandwidth, blank resources, etc.

Type 1: when both RATs are aligned, it may be also assumed that NR may reserve DC tone unused as well. In this case, the PRB formation of NR would not be affected. In case NR does not reserve DC tone, the similar issue or handling to Type 0 would be necessary. In other words, different RB grid between NR and LTE can be assumed though the center frequency is shared, also synchronization signals can be transmitted in frequency not in the center frequency for NR as well.

In terms of configuration, the frequency offset between NR and LTE center frequency, NR system bandwidth, necessary information are signalled to the UE. For UEs not supporting LTE, LTE bandwidth/resources would be treated as if "blank resources".

In terms of blank resources, two types of blank resources configuration can be considered.

Entire blank: if used, a UE can assume that any RS/data/control will not be mapped to the configured resource.

Partial blank: if used, a UE can assume that there could be some RS/data/control to be mapped to the resource and at least partial resources would not be used. In terms of partial resources not usable, some signalling can be considered—one is the bitmap of 144 (one RB mapping) where each bit can be mapped to one RE in the PRB which then will be assumed to be constant across the configured PRBs. Alternative signal reductions can be also considered, for example, legacy control region symbol length, CRS ports, cell ID, CSI-RS, PRS, which can cover legacy LTE cell-common signals. Alternatively, blank resource may be configured in a subcarrier level instead of PRB level to allow finer configurability. Or blank resource at OFDM symbol level can be also considered.

To allow blank subframe configuration dynamically, semi-statically configured blank subframe set(s) can be dynamically enabled or disabled. For example, semi-static set(s) of blank resources can be configured, which can be dynamically enabled or disabled via the following approaches (1) Explicit enabling/disabling dynamic signalling: L1 or MAC CE can be used to dynamically enable/disable the blank subframe configuration. The signalling can be UE-specific or cell-common or group-specific. Also, a pattern can be indicated dynamically from a set of semi-statically configured blank resource patterns.

(2) UE's blind detecting (BD): via the scheduling, and/or detecting the associated NR signals in the blank resources, the UE may detect whether the resource is used for NR or not. Or, depending on UE BD on some other signals which can be present in the blank resource (e.g., LTE CRS), the UE may determine whether the resource is being used for other RAT or other purpose.

When the UE is configured with LTE and NR, depending on the anchor RAT type (based on initial cell association procedure), the following approaches can be considered.

(1) Anchor RAT is LTE: in this case, additional NR resources can be considered as "segments" which can be used for control and/or data transmission where CRS is not assumed to be transmitted. RS for control/data demodulation can be separately signalled.

(2) Anchor RAT is NR: in this case, additional LTE resources can be considered as "partial blank" resources which then can be used with proper rate matching on legacy LTE signals.

Depending on the bandwidth of each RAT, either (1) or (2) can be selected and used.

Another approach is to assume "CA" between two RATs to allow separate MAC entity in different MAC.

Figure 8:
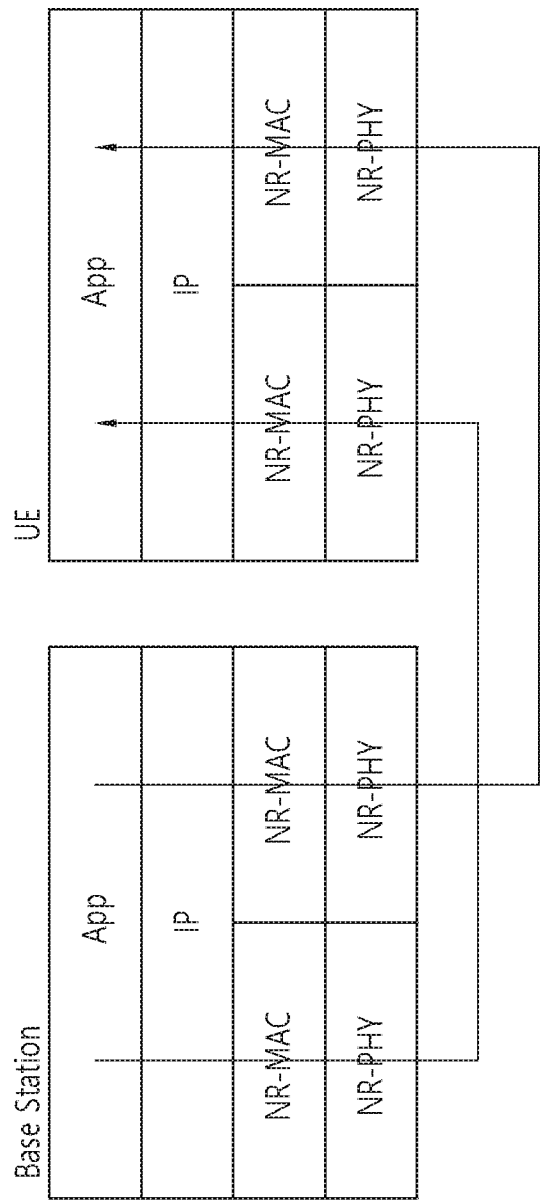
FIG. 8 illustrates separate two MAC entities in the base station and the UE.

FIG. 8 illustrates separate two MAC entities in the base station and the UE.

For example, in type 0, intra-contiguous CA can be assumed for NR and LTE. In type 1, intra CA can be assumed where handling of segmented NR carrier may be different per UE implementation. One example is to configure "three" intra-contiguous CA carriers in type 1.

In case CA approach is used between NR and LTE, the following procedures would be clarified.

(1) PCell determination: between NR and LTE, PCell may be clarified. It may follow initial synchronization signal detection, and may be changed via RRC signaling once cell association procedure is completed. In other words, the similar cell association procedure mentioned in above can be used for CA case as well which can be reconfigured once cell association is completed.

(2) Cross-carrier scheduling: by allowing NR-MAC and LTE-MAC tight interaction, real-time processing, cross-carrier scheduling may be used. When cross-carrier scheduling is used, the control format would follow a carrier used for scheduling a another carrier. In terms of downlink control information (DCI), a format of the scheduled carrier is used as a reference. In other words, actual control channel format can follow scheduling carrier's RAT type and content can be based on scheduled carrier's RAT type. One consideration is to allow "dynamic" bandwidth change between LTE and NR, which may be indicated in scheduling, the bandwidth of LTE dynamically.

(3) scheduling request (SR): SR can be transmitted to any RAT, which may have different format. In terms of "timer", a single timer can be shared between different RATs as long as timer values are consistent. Or, independent SR can be configured per each RAT. When the same timer is used between two RATs, once timer expires in one RAT, it will also trigger timer expire in the other RAT and perform the necessary procedures.

(4) power headroom report (PHR): PHR can be also reported in a shared format between two RATs. However, it may be desirable to report different contents per each RAT which are shared by two RATs. For example, when a UE is capable of using only one uplink, the PHR value can be different depending on RAT type, and thus, two different PHRs can be reported even though the UE supports only one UL carrier. In case of UL carriers, either each may be associated with different RAT or each may be shared between two RATs. Depending on its configuration, PHR reporting can be different. As long as one UL can be associated with two different RATs, different PHRs can be reported.

Regardless which approach is used to support LTE and NR, synchronization assumptions should be clarified between LTE synchronization signals/RS and NR synchronization signal/RS. To allow the listed approaches, it is necessary to satisfy at least "CA" synchronization requirements (tight synchronizations). Simple assumption could be to assume "QCL" between LTE and NR sync/RS transmissions. In other words, based on LTE synchronization signals and/or RS, NR RS can be fine-tuned (and vice versa).

Another approach is to support LTE and NR together via dual connectivity like framework where separate MAC and handling are assumed. In this case, any relationship between two RAT's sync/RS may not be necessary. Similar to dual connectivity, the synchronization assumptions can be indicated by higher layer signaling.

III. Different Interworking Mechanisms (1) RAT Type Configuration Per RRC or UP Connection In terms of RAT configuration, it can be configured similar to "transmission mode". In other words, per U-Plane bearer or RRC connection, different RAT type may be configured. Different RAT type may indicate or define the UE behaviour of at least some or all of the followings.

Control channel design whether to follow NR control channel configuration/design or LTE control channel configuration/design DCI content PDSCH coding mechanism, TBS table, MCS table, etc CQI mechanism (2) Sync Reference of LTE Cell for NR Cells For efficient UE behaviour cell common transmission may be performed using one RAT type. Furthermore, this can be also indicated with SCell addition where different RAT type may be used per different CC. Also, if NR and LTE cell may perform CoMP operation, in terms of data rate matching and all, RAT type may be also indicated dynamically or rate matching factor may be dynamically indicated. Though QCL relationship between RS types transmitted in NR may not present, QCL relationship between LTE-CRS and NR-RS (e.g., UE DM-RS or beam RS) may be present which can be signalled. Using this mechanism, a UE may be able to perform coarse synchronization which may not be doable by NR RS transmissions except for NR-PSS/NR-SSS. This cell can be configured as "reference carrier". By this way, a network may be able to deploy one LTE cell with many neighbour NR cells without compromising UE synchronization performance considerably.

(3) Data Offloading to NR Cells or LTE Cells

Depending on blank resource configurations, load etc, a UE supporting both LTE and NR can be configured with two cells in the same frequency with NR and LTE. A UE can be configured with receiving control from either cell and data from either cell. The data and/or data can be transmitted from one or two cells dynamically. The benefit of this approach is to allow low latency requiring UEs can be serviced regardless of invalid subframe or invalid resources. For example, one approach is to use different subframe location of two RAT types for "always-on" signals such as synchronization signals such that a UE can be still scheduled with data in those resources at least from one of the cell. This can be partially supported by allowing CoMP operation between LTE and NR cells. Different from legacy LTE CoMP, legacy CRS assumption would be changed depending on the RAT type of each participating CoMP cell. To enhance the performance of legacy CRS reception, optionally zero-power CRS can be used for neighbour NR cells.

(4) Group or Cell-Specific Data/Control Transmission Via LTE and UE-Specific Control/Data Transmission Via NR Another approach to support coexistence or tight interworking between LTE and NR is to utilize "omni-directional" transmission of LTE and "directional, beamforming" transmission of NR. For example, to dynamically change and indicate the beam direction, LTE carrier can be utilized to indicate such signals. One example is to utilize the same numerology with two different antenna transmission mechanisms in different frequency (which may be operated by different cell or eNB), omni-directional transmission can indicate necessary information for beam-formed transmission including broadcast information, beam-scheduling information, etc. Another example such an operation is to perform initial access via LTE cell and aggregate NR which can be used for after RACH procedure. This is similar to "anchor" carrier and "hand-over" to additional carrier where anchor carrier may or may not be operated in parallel with hand-over carrier or additional carrier. If this is applied, NR cell may not transmit any cell common signals or optionally turn off such signals.

The embodiments illustrated above may be implemented by various instruments. For example, the embodiments of the present invention may be implemented by hardware, firmware, software, or combinations thereof, which will be described in detail with reference to FIG. 9.

Figure 9:
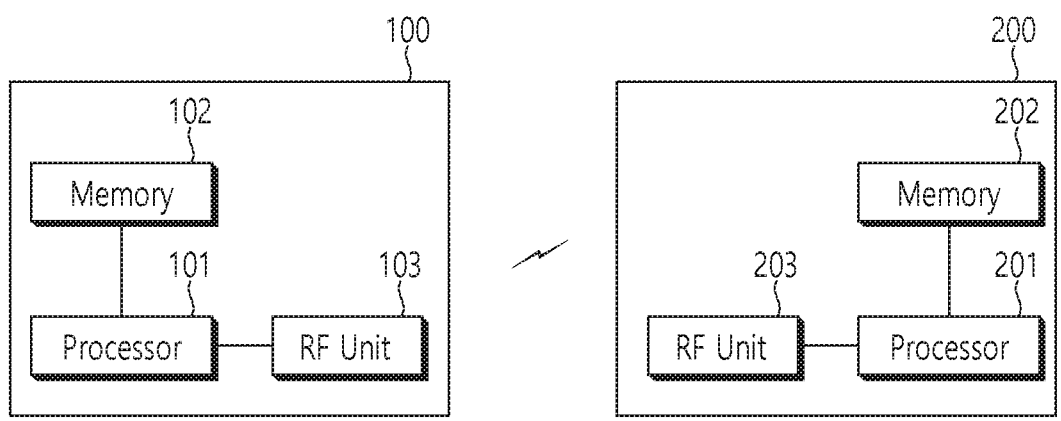
FIG. 9 is a block diagram illustrating a wireless communication system according to an embodiment of the present invention.

FIG. 9 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods may be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving data, the method performed by a wireless apparatus and comprising:

receiving, from a serving cell supporting new radio access technology (NR), information related to cell-specific reference signal (CRS) of a long term evolution (LTE) cell, which includes information related to a CRS antenna port for the CRS of the LTE cell and information related to a v-shift value for the CRS of the LTE cell, based on the wireless apparatus supporting the NR;

determining resource elements (REs) used for the CRS of the LTE cell based on the information related to the CRS of the LTE cell; and receiving, from the serving cell supporting the NR, the data, which is related to the NR, wherein the data is not mapped in the REs that are used for the CRS of the LTE cell, wherein the data is received based on an assumption that the data is rate-matched in one or more REs except for the REs used for the CRS of the LTE cell, and wherein the data is rate-matched in the one or more REs except for the REs used for the CRS of the LTE cell, based on that a subcarrier spacing for the data, which is related to the NR, is 15 kHz.

2. The method of claim 1, further comprising:
receiving a primary synchronization signal (PSS) from the serving cell supporting the NR,
wherein the PSS is not located in a center frequency of the serving cell.

3. The method of claim 2, further comprising:
receiving information related to a frequency location of the PSS, which is not located in the center frequency of the serving cell.

4. The method of claim 1, further comprising:
receiving a radio resource control (RRC) signal including information of parts of a bandwidth of the serving cell.

5. The method of claim 4, wherein the wireless apparatus operates in at least one part within the bandwidth of the serving cell based on the RRC signal.

6. A wireless apparatus configured to receive data, the wireless apparatus comprising:
a transceiver; and
a processor operatively coupled to the transceiver and configured to:
control the transceiver to receive, from a serving cell supporting new radio access technology (NR), information related to cell-specific reference signal (CRS) of a long term evolution (LTE) cell, which includes information related to a CRS antenna port for the CRS of the LTE cell and information related to a v-shift value for the CRS of the LTE cell, based on the wireless apparatus supporting the NR;

determine resource elements (REs) used for the CRS of the LTE cell based on the information related to the CRS of the LTE cell; and control the transceiver to receive, from the serving cell supporting the NR, the data, which is related to the NR, wherein the data is not mapped in the REs that are used for the CRS of the LTE cell, wherein the data is received based on an assumption that the data is rate-matched in one or more REs except for the REs used for the CRS of the LTE cell, and wherein the data is rate-matched in the one or more REs except for the REs used for the CRS of the LTE cell, based on that a subcarrier spacing for the data, which is related to the NR, is 15 kHz.

7. The wireless apparatus of claim 6, wherein the processor is further configured to:
control the transceiver to receive a primary synchronization signal (PSS) from the serving cell supporting the NR,
wherein the PSS is not located in a center frequency of the serving cell.

8. The wireless apparatus of claim 7, wherein the processor is further configured to:
control the transceiver to receive information related to a frequency location of the PSS, which is not located in the center frequency of the serving cell.

9. The wireless apparatus of claim 6, wherein the processor is further configured to:
control the transceiver to receive a radio resource control (RRC) signal including information of parts of a bandwidth of the serving cell.

10. The wireless apparatus of claim 9, wherein the wireless apparatus operates in at least one part within the bandwidth of the serving cell based on the RRC signal.

* * * * *